Aug. 15, 1939.  P. A. MARSAL  2,169,702

DRY CELL

Filed March 18, 1936

INVENTOR
PAUL A. MARSAL
BY
ATTORNEY

Patented Aug. 15, 1939

2,169,702

UNITED STATES PATENT OFFICE 2,169,702

DRY CELL

Paul A. Marsal, Lakewood, Ohio, assignor to National Carbon Company, Inc., a corporation of New York Application March 18, 1936, Serial No. 69,503

9 Claims. (Cl. 136—133)

This invention relates to galvanic cells and, more particularly, to improved sealing means for so-called dry cells.

It is important to retard or prevent the leakage and evaporation of moisture from dry cells, and to permit escape therefrom of gases generated therein. Formerly, a relatively thick body of wax composition was used to seal the dry cell; and, more recently, a much thinner closure, such as sheet metal, has been used instead of the wax seal. The thinner closure usually comprises an annular disc-like cover member which has its outer margin permanently and gas-tightly secured to the upper end of the zinc container electrode, and has its inner margin gas-tightly supported by the central carbon electrode. The carbon electrode preferably is sufficiently porous to vent gas generated in the cell and is treated with lubricating oil or other suitable composition to prevent loss of moisture through its pores. In the smaller or so-called flashlight size of cell, the top end of the carbon electrode carries and contacts with a brass cap having a flange to provide a bearing or support for the inner margin of the cover and for an electrically non-conductive member which insulates the cover from this cap and the carbon electrode. Compared with those having wax seals or closures, the cells provided with the thin closures are stronger, more uniform in performance and appearance, and have a considerably greater useful space within the cell for active material,—comparing cells of the same dimensions.

In some types of cells, such as the metal-sealed cells for flashlight service, the usefulness of such extra space has been severely limited because the flange of the brass cap is exposed inside the cell. Under certain conditions the various salts, which partly compose the cell electrolyte, creep up the inside surface of the zinc can and across the inner surface of the metal cover, making contact with the cover and the flange of the brass cap and resulting in deterioration and destruction of the cell. The creepage of these salts is especially harmful at elevated temperatures and humidities, such as are common in tropical climates. For this reason it has been necessary to retain as an air space a considerable part of the volume gained by the use of the thinner seal and, in some instances, to provide special means to increase the length of the creepage path.

Accordingly, the principal objects of this invention are to overcome the above-described objectionable features of dry cells having thin covers, especially those comprising sheet metal; to provide a cell in which a substantial portion of the extra space, made available by the thin cover, may be safely used to increase the volume of active material in the cell; to provide a cell in which metal parts of the closure, especially the gap between such parts, are internally protected against contact with active material in the cell; to provide a cell which is more effectively sealed against loss of moisture; and to provide a cell which will more successfully withstand deterioration under various conditions of temperature and humidity throughout the world, particularly in or near the tropics and in humid localities. These and other objects and the novel features of this invention will be apparent from the following description taken with the accompanying drawing, in which:

Figure 1:
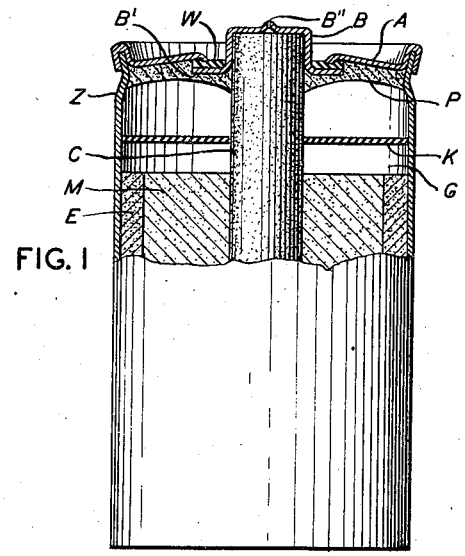
Figure 1 is a view, partly in section, illustrating a dry cell embodying this invention.

According to this invention, an annular body or mass of plastic sealing material, which is moisture repellent and electrically non-conductive, is applied to interior surfaces of the cell closure and to interior portions of the electrode surfaces adjoining the closure, after the closure has been permanently secured to the cell. The composition of the plastic material is such that, when properly deposited and set in sealing position, it firmly adheres to these internal surfaces and resists any tendency of the electrolyte salts or active material to creep along or across its surface to short circuit or otherwise damage the cell. The plastic material preferably covers the entire interior surface of the closure, including the joints between parts of the closure and the joints between the closure and the carbon and zinc electrodes. However, in some instances it is sufficient to apply the plastic material so that it internally bridges and covers only the joint between the flange of the brass cap and the inner margin of the cover member resting thereon, as well as the joint between the carbon electrode and the brass cap; or only the joint between the cover member and the zinc can. The relatively thick solid adherent body of plastic material thus protects and insulates the interior surface of the closure, particularly the adjoining portions of the cover and the brass cap, by preventing access of electrolyte thereto; and said material provides an electrolyte anti-creepage means which also more effectively seals the cell at the joints between the closure and the electrodes, preventing loss of moisture from the cell. By this construction, deterioration of the cell is greatly retarded, and a considerably larger volume of active material may be safely used in the cell.

The several figures of the drawing illustrate the invention applied to a typical dry cell of the size used for flashlight service but the invention is not limited to this type of cell. As shown, the cell comprises a cylindrical zinc can or container electrode Z; a cylindrical carbon electrode C disposed centrally within and spaced from the outer electrode Z; a cylindrical body of depolarizing and active material or mix M in which the inner end of the electrode C is embedded; and a bibulous spacing material E between the mix M and the electrode Z. The spacing material E may consist of suitable paste or absorbent material such as paper, and contains a suitable electrolyte such as an aqueous solution of zinc chloride and ammonium chloride. The electrode C preferably consists of a solid rod of porous carbon treated with a moisture-repellent composition, so that gas generated in the cell will vent through this electrode to the atmosphere but substantially no moisture will escape from the inside of the cell. Otherwise, the parts just described may be of the usual or any preferred type. An annular collar K of stiff paperboard or other suitable material is disposed in the gas space G at a substantial distance above the mix M and is rigidly held in place by the frictional engagement of its edges with the inside surfaces of the electrodes Z and C.

The closure of the cell may comprise a relatively thin annular cover member A and a metal cap B. The cap B may be a cup-shaped member of brass or other suitable sheet metal fitting the upper end of the electrode C, and desirably is provided with an out-turned annular flange B' at its lower edge and a vent hole B'' opposite the top of the electrode C. The cover A may consist of relatively rigid but resilient sheet material such as metal, paperboard, fiberboard or molded plastic material; and as shown it consists of thin sheet iron or steel. The outer margin of the cover A preferably is permanently and gas-tightly secured to the upper end of the electrode Z, as by tightly rolling or spinning the margin of the cover A over the circular outwardly-inclined edge of the can Z, thus interlocking adjoining portions of the cover A and can Z to permanently unite these parts. The inner margin of the cover A is supported by the electrode C, since it presses firmly against an annular washer W of moisture-proof and electrical insulating material which is carried by the flange B' of the cap B that is mounted on the electrode C.

As previously explained, active material of the cell often contacts with the interior surfaces of the closure and the joints between the closure and the electrodes, deteriorating or destroying the cell. As shown in Figure 1, this is prevented by applying a body or mass P of suitable material to the entire interior surface of the closure and to the joints between the closure and the electrodes, by melting or fusing and depositing said mass into sealing position after the closure has been secured to the zinc can. The mass P may consist solely of thermoplastic material which is both moisture-proof and electrically non-conductive and, when set, adheres firmly to the interior surfaces of the cover and the adjoining interior surfaces of the electrodes. It will be seen that the plastic material P bridges the gap between the flange B' and the cover A, thereby effectively preventing access of electrolyte salts to these parts. In addition, the joint between the cover A and the electrode Z and the joint between the cap B and the electrode C are completely and gas-tightly sealed to more effectively resist loss of cell moisture or creepage of electrolyte salts through or across these joints. The mass P thus constitutes the sole means for internally sealing the joints between the cover and the electrodes, and for resisting creepage of electrolyte to and across such joints.

Figure 2:
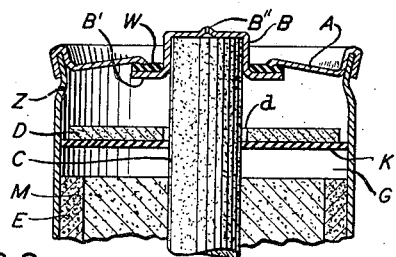
Figures 2 and 3 are sectional views illustrating steps in the process of manufacturing the cell shown in Figure 1.
Figure 3:
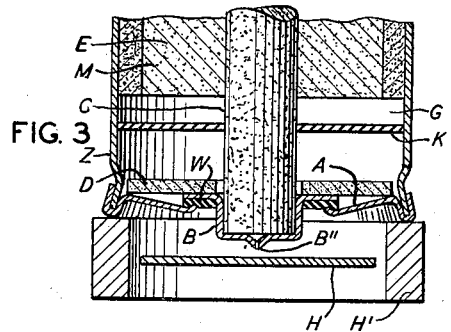

Various procedures may be followed in applying the unitary body or mass P to manufacture an improved cell embodying this invention. As shown in Figures 2 and 3, before the cover A and cap B are secured in place a ring or annular disc D of thermoplastic material is placed on the collar K surrounding the electrode E within the cell. The diameter of the central hole $d$ of the disc D is somewhat greater than the diameter of the electrode C so that the disc D will slide freely vertically along the electrode C. The closure is then permanently secured to the cell in the manner already described. The cell is then inverted, whereupon the disc D will be guided by the electrode C and drop down into horizontal contact with portions of the interior surface of the closure. Sufficient heat is then applied to the closure of the cell to melt the disc D and cause it to flow over and cover the entire interior surface of the closure and the joints thereof, to produce the adherent protective mass P.

Figure 4:
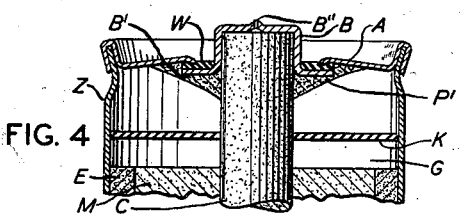
Figures 4 and 5 are sectional views similar to the top part of Figure 1, illustrating other cells embodying this invention.
Figure 6:
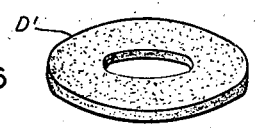
Figures 6 and 7 are perspective views of the annular bodies of plastic material used in manufacturing the cells shown in Figures 4 and 5, respectively.
Figure 5:
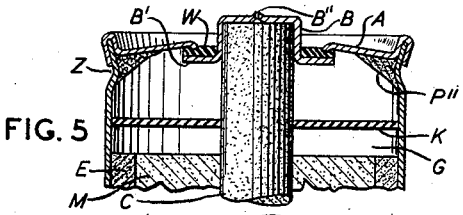
Figure 7:

In some instances it will be sufficient to apply an adherent protective mass only to the gap between the flange B' and the cover A and between the flange B' and the electrode C, as shown at P' in Figure 4. Here, a thermoplastic disc D', as shown in Figure 6, having the same internal diameter as, but a smaller external diameter than, the disc D, may be used to produce the protective mass P'. Similarly, it will be sufficient in some constructions to apply a protective mass only to the joint between the cover A and the zinc can Z, as shown at P'' in Figure 5. Here a thermoplastic disc D'', as shown in Figure 7, having the same external diameter as, but a larger internal diameter than, the disc D, may be used to produce the protective mass P''. The masses P' and P'' prevent salt creepage to the flange B' and also effectively seal the outer joint of the closure, so that less precision in the closing operation is necessary. The use of the protective mass P'' also leaves the inner margin of the cover A free to be lifted off the washer W, to serve as an auxiliary vent to release excessive gas pressure generated in the cell.

The same general procedure, as that described in connection with Figures 2 and 3 and the use of the disc D, is followed in inserting, displacing and using the discs D' and D'' to produce the masses P', P'', respectively, except that the fusing heat may be more localized in applying the latter. For example, in applying the mass P"
the localized heating may be concentrated upon
the outer seam or joint of the closure and the
electrode Z.

The discs D, D' and D" may consist of any
suitable thermoplastic material that may be fused
or melted at moderately elevated temperatures
and will readily solidify at ordinary room temperatures to produce a protective mass which is
adherent after melting and solidification, is electrically non-conductive, and resistant to moisture
and creepage of electrolyte salt. A thermoplastic
composition which has been found to be satisfactory is as follows:

| | |
|---|---|
| Soft asphalt | 5 parts by weight |
| Montan wax | 5 parts by weight |
| Asbestine (talc) | 4 parts by weight |
| White paraffin | 1 part by weight |
| Tung oil | 2 cc. per 100 grams of the above materials |

Other suitable materials are: A mixture of
gilsonite selects with soft asphalt; chlorinated
paraffin; ceresin wax; a mixture of rosin and
rubber; and a mixture of stearic acid, tallow,
candelilla wax and petrolatum.

For a typical flashlight dry cell 1¼ inches diameter by 2¼ inches high, a thermoplastic disc
one-sixteenth inch thick and seven-eighths inch
in diameter with a center hole eleven thirty-seconds inch in diameter is satisfactory for disc D.

Various means, such as an open flame, electrical heating as by induction or high frequency,
or exposure to radiant heat, may be used to apply heat to the closure or to the top part of the
cell to melt the internal thermoplastic disc. As
shown in Fig. 3, radiant heat preferably is used
and may be applied by an electrically heated body
H consisting of a ribbon of metal resistance alloy
such as nichrome. A suitable spacing member
H' may support the cell at the proper distance
above the heater H. An exposure of about 45
seconds, at a distance of about one-fourth inch
between the cover of the cell and the radiant
body H heated to about cherry red, has been
found satisfactory to melt a properly located disc
of the type of disc D. Obviously, the heating
interval will vary with various factors such as
the nature of the thermoplastic material, the
temperature of the cell, the type of closure, etc.

Figure 8:
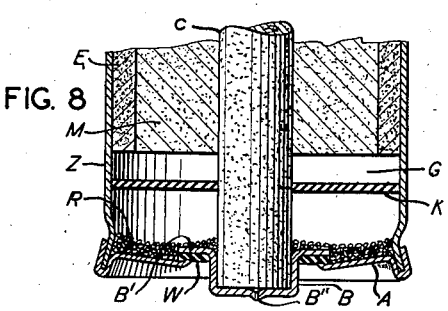
Figure 8 illustrates a step in another process of manufacturing a cell embodying this invention.

The use of the thermoplastic material in ring
or disc form affords distinct advantages in handling and in controlling the quantity and distribution of material. However, in some instances, e. g., for less precise distribution of the
protective mass, thermoplastic material in loose,
freely-movable pulverized or pellet form may be
placed on the collar K in the cell. Such pellet
material R is shown in the inverted cell of Figure 8, ready to be heated as previously described
to produce a relatively thick solid adherent protective mass similar to the mass P of Figure 1.

Figure 9:
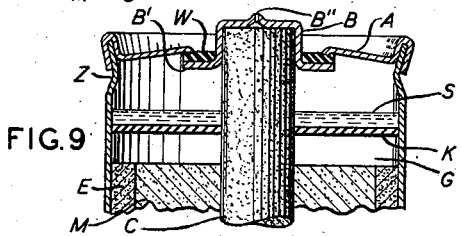
Figures 9 and 10 are views illustrating steps in other processes of making dry cells embodying this invention.

The procedure illustrated in Figure 9 has also
been found practicable. Here a molten sealing
material S of the kind already described is
poured onto the collar K just prior to the seaming or closing operation. The closure is then
quickly spun in place and the cell is quickly inverted. The molten material then flows down
and completely covers the interior surfaces to
be protected and, upon cooling to room temperature, solidifies and produces a solid adherent protective mass similar to the protective mass P of
Figure 1.

Figure 10:
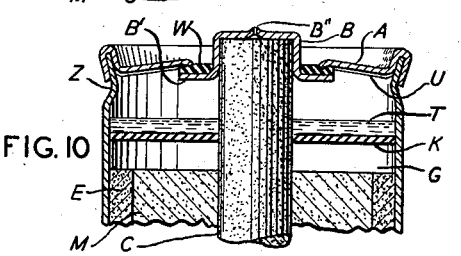

In some instances, instead of using a thermoplastic material it is desirable to use materials
which will polymerize to produce the desired adherent coating or protective mass. As shown in
Figure 10, a suitable polymerizable material T
may be deposited or poured onto the collar K just
prior to the closing operation. After the closure
has been permanently secured in place, the cell is
inverted and aged in the inverted position until
the polymerizing material has solidified to produce a protective mass similar to the coating or
mass P of Figure 1. For this purpose it has been
found satisfactory to use a tung oil which is
polymerized by ferric chloride,—a practical formula being: Tung oil, 100 grams; ferric chloride,
6 grams; and acetone, 2 grams. If the materials
which form the protective mass react too quickly,
they may be kept separate until after the cell has
been closed and inverted. This may be done by
applying one of the reactive constituents to the
inner surface of the cover, as indicated at U in
Figure 10. When the cell has been closed and is
inverted, the other reactive constituent, such as
T, will be deposited upon the constituent U,
whereupon a reaction will occur to produce a
protective mass similar to the mass P of Figure 1.

While numerous embodiments of this invention
are disclosed herein, it will be understood other
variations and changes are possible without departing from the principles of the invention or
sacrificing its advantages.

What is claimed is:

1. A galvanic cell comprising a container electrode; an inner electrode therein; a metal closure
permanently secured to said container electrode
and supported by said inner electrode; insulating
means between a portion of said closure and one
of said electrodes; and a unitary relatively thick
solidified mass of thermoplastic moisture-repellent material permanently adhering to and covering at least a portion of the interior surface of
said closure and the adjoining interior surface
portion of one of said electrodes and also bridging
and internally covering the joint between said
closure and such adjoining electrode portion,
said unitary mass being electrically non-conductive and constituting the sole means for internally sealing said joint and for resisting creepage
of electrolyte to and across said joint.

2. A galvanic cell comprising a container electrode; an electrode member within the latter and
spaced therefrom; a metal closure member having one margin thereof rigidly secured to said
container electrode; electrolyte material within
said container electrode between the latter and
the said electrode member, leaving a free space
above said electrolyte material; a metal cap carried by said electrode member having a portion
of its surface within said free space; the said
closure member also having a marginal portion
supported by but electrically insulated from said
cap; and a relatively thick solidified mass consisting solely of thermoplastic protective material permanently adhering to said closure member and to the metal cap within said free space
and covering the joint between said closure member and said cap, said relatively thick mass of
material resisting creepage of said electrolyte to
said joint.

3. A galvanic cell as claimed in claim 1, in
which said mass of material internally covers the
joint between said container electrode and said
closure.

4. A galvanic cell as claimed in claim 1, in
which said mass of material internally covers the joint between said inner electrode and said closure.

5. A galvanic cell as claimed in claim 1, in which said mass of material internally covers the joints between said closure and said electrodes and also completely covers the interior surface of said closure.

6. A galvanic cell as claimed in claim 1, in which said closure comprises a metal cap carried by said inner electrode, and a metal cover member having a marginal portion bearing against but electrically insulated from said cap; and said mass of material bridges and covers the internal portion of the joint between said cap and said cover member.

7. A galvanic cell comprising a container electrode; an inner electrode therein; a metal cap carried by said inner electrode and having a flange; an insulating washer seated on said flange; an annular metal cover having its outer margin permanently secured to said container electrode and its inner margin engaging said washer; and a relatively thick solidified mass consisting solely of thermoplastic moisture-repellent and electrically non-conductive material permanently adhering to and covering the interior surfaces of said flange and said cover and the gap therebetween, and also permanently adhering to and internally covering the joint between said inner electrode and said cap and the joint between said container electrode and said cover.

8. A dry cell comprising a zinc container electrode; a carbon electrode centrally therein; active material, including a deliquescent salt, in said container electrode between said electrodes; a closure for said cell comprising a metal cap fitting the top end of said carbon electrode and having a flange, a washer of electrical insulating material seated on said flange, and an annular sheet metal cover having its outer margin permanently secured to the top end of said container electrode and having its inner margin engaging said washer; and a relatively thick and solid mass consisting solely of thermoplastic moisture-repellent and electrically non-conductive material permanently fused into position against and adhering to the interior surface of said closure and internally covering the joints between said closure and said electrodes.

9. A galvanic cell comprising a container electrode; an inner electrode therein; a cell closure having a portion supported by said inner electrode and an outer margin interlocked with, and thereby permanently secured to, a portion of said container electrode, to permanently unite said closure to said container electrode; and a unitary relatively thick solidified mass of thermoplastic moisture-repellent material permanently adhering to and covering at least a portion of the interior surface of said closure and the adjoining interior surface portion of one of said electrodes and also bridging and internally covering the joint between said closure and such adjoining electrode portion, said unitary mass constituting the sole means for internally sealing said joint and for resisting creepage of electrolyte to and across said joint.

PAUL A. MARSAL.